United States Patent [19]
Kaufmann et al.

[11] Patent Number: 5,279,652
[45] Date of Patent: Jan. 18, 1994

[54] USE OF SOLIDS AS ANTIBLOCKING ADDITIVES FOR MARKER LIQUIDS

[76] Inventors: Rainer Kaufmann, Witts Allee 32, D-2000 Hamburg 55; Günther Herrnring, Pinndiek 13, D-2081 Alvesloe, both of Fed. Rep. of Germany

[21] Appl. No.: 939,579

[22] Filed: Sep. 3, 1992

Related U.S. Application Data

[62] Division of Ser. No. 445,727, Nov. 22, 1989, abandoned.

[30] Foreign Application Priority Data

Mar. 24, 1988 [DE] Fed. Rep. of Germany ....... 3809898

[51] Int. Cl.$^5$ .............................................. C09D 11/16
[52] U.S. Cl. .................... 106/19 A; 106/23 F; 106/23 H; 106/22 F; 106/22 H; 106/25 R; 106/19 C; 106/19 F
[58] Field of Search ............. 106/19A, 19C, 19F, 22F, 22H, 25R,

[56] References Cited

U.S. PATENT DOCUMENTS

| | | | |
|---|---|---|---|
| 2,623,827 | 12/1952 | Moos | 106/22 |
| 3,776,742 | 12/1973 | Sanders | 106/22 |
| 4,170,669 | 10/1979 | Okada | 106/19 A |
| 4,369,270 | 1/1983 | Dietz et al. | 106/20 |
| 4,460,727 | 7/1984 | Shoji | 106/23 |
| 4,525,216 | 6/1985 | Nakanishi | 106/23 |
| 4,830,671 | 5/1989 | Frihart et al. | 106/27 |
| 5,006,170 | 4/1991 | Schwarz et al. | 106/22 |

Primary Examiner—Helene Klemanski
Assistant Examiner—Margaret Einsmann
Attorney, Agent, or Firm—Lowe, Price, LeBlanc & Becker

[57] ABSTRACT

Solids which are soluble in a common solvent or solvent mixture, possibly containing a common high-boiling substance of common marker liquids for writing instruments with a common capillary feeder opening, with a melting point $\geq 30°$ C. and a molecular weight $\leq 1000$ daltons, and which, when they are the sole ingredient in the solvent or solvent mixture, crystallize on the feeder opening, forming outwardly growing crystallites, can be used as antiblocking additives for such marker liquids in a proportion of at leat 1% in weight, relative to the final composition of the marker liquid, for protective and anti-evaporating closure of the capillary feeder opening when it is unprotected and not in use.

22 Claims, 1 Drawing Sheet

USE OF SOLIDS AS ANTIBLOCKING ADDITIVES FOR MARKER LIQUIDS

This application is a division of application Ser. No. 07/445,727 filed Nov. 22, 1989 now abandoned.

TECHNICAL FIELD

The invention is directed to the use of solids as antiblocking additives in common marking fluids for writing instruments having a common capillary outlet opening in order to provide a protecting and the evaporation hindering closure of the open, unprotected and unused capillary outlet opening.

BACKGROUND OF THE INVENTION

It is known that the capillary outlet openings of writing instruments, recording instruments, drawing instruments and printers as well as of marking pencils and plotters (said instruments are referred to from now on as writing instruments) are clogged or plugged due to the drying of the marking fluid. The outlet openings of such writing instruments are therefore normally covered by a sealing cap which hinders the evaporation of the volatile components of the marking fluid. In particular the evaporation of the solvent or the solvent mixture is stopped by such a cap in a more or less effective manner.

In case no such caps are put on the capillary outlet opening the marking fluid dries very quickly and plugs the capillary outlet opening.

In order to avoid a fast drying of the marking fluid at the capillary outlet opening or in said capillary outlet opening, respectively, of writing instruments it is known to add liquid additives, to said marking fluids having a low vapour pressure and being hardly volatile. Due to said liquid additives, it is possible after evaporation of the other liquid components of the marking fluid to reuse the writing instruments and to start writing with them again.

Said marking fluids, which are admixed with said known liquid additives, have, however, the disadvantage that they dry very badly on non-absorbing supports or pads, such as foils, glass or metal. A further considerable disadvantage is the fact that the properties of the marking fluid with respect to the surface tension and the viscosity have changed after the more volatile components of the marking fluid have evaporated at the capillary opening of the writing instruments. Consequently the quality of the recording, such as the sharpness of the edge, the penetration of the marking fluid to the backside of the support and the wipe resistance, are reduced after starting writing again until the original mixture of the marking fluid reaches the outlet opening again and flows out of said outlet opening.

SUMMARY OF THE INVENTION

It is therefore the object of the present invention to improve marking fluids for writing instruments in such a way that said marking fluids do not dry out or desiccate at or in the capillary outlet opening any longer so that the writing instruments remain "in a writable condition" for a longer period of time.

It has now surprisingly been found that it is possible to improve the writing properties of marking fluids and in particular their capacity to be openly stored in a rather important manner by using or incorporating, respectively, solids in common marking fluids. This is insofar very surprising as it is believed up to now that marking fluids dry out the faster the higher the amount of solid matter is.

Figure 1:
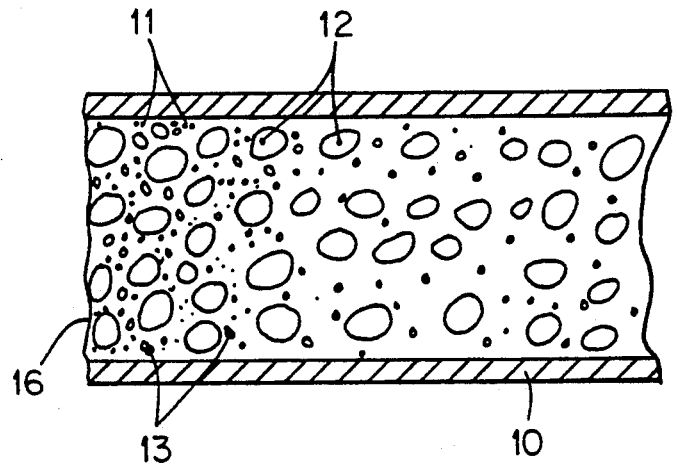
FIG. 1 is a cross-section through a capillary feeding tube of a writing, drawing or printing instrument.

According to the present invention a solid is added to the solvent or solvent mixture of a marking fluid for writing instruments having a common capillary outlet opening. Said solvent or solvent mixture can, if desired, contain a component having a high boiling point. The solid used has a melting point $\geqq 30°$ C. (at atmospheric pressure) and a molecular weight $\leqq 1000$ Dalton.

DETAILED DESCRIPTION OF THE INVENTION

The solvent as used according to the present invention has to be soluble in the particular and common solvent or a solvent mixture, respectively, which is known per se and common for the marking fluids referred to and which may contain a component having a high boiling point and common additives known per se.

In addition, the solid as used according to the present invention has to fulfill the following requirement. In case the solid is present alone in the solvent or solvent mixture, it must be capable of crystallizing at the capillary outlet opening by forming outgrowing crystals. In other words, the solid has to possess the ability to crystallize out of the solvent or solvent mixture in the manner described whereby the solvent or the solvent mixture may not contain any dye or pigment, any common additive and any component having a high boiling point. For checking this ability of the solid used according to the present invention the solvent or solvent mixture must therefore be pure or a pure mixture. It is emphasized already at this point that said crystallizing properties serve the purpose of defining the solids used.

The component having a high boiling point as referred to in the present documents are those known liquids which are commonly used in the field of the present invention and which have a boiling point $\geqq 180°$ C. The solvent or the components of the solvent mixture, respectively, are liquids which are normally and commonly used for dissolving and/or dispersing dyes and/or pigments and the boiling point of which is $\leqq 180°$ C.

The term "marking fluid" refers to common recording compositions such as inks, china inks, pigmented inks, lacquers and fluorescent liquids for high-lighting written texts (markers).

China inks are normally black or coloured recording liquids or fluids which dry in a water-proof manner and which contain finally dispersed, undissolved pigments and at least one resin which also dries in a water-proof manner.

Inks normally contain the dye in a dissolved form.

Pigmented inks may be referred to as light or highly fluid China inks which may also contain a dissolved dye besides the dispersed pigment. Also fluorescent pigmented inks are already available on the market.

As can be taken from the above the "borders" between the recording compositions mentioned above are not clearly defined. The solids as used according to the present invention can be admixed to all such recording compositions or marking fluids, respectively.

Due to its ability to form crystals during the crystallisation process at or in, respectively, the capillary outlet opening in the solvent or solvent mixture employed, the solid as used according to the present invention is able, when used in a common marking fluid (for instance ink or China ink), to form together with the other components of said marking fluid a liquid crystalline to solid crystalline boundary layer in the capillary outlet opening at the contact surface (surface area) between the marking fluid and the air. Said liquid crystalline to solid crystalline boundary hinders the evaporation of the solvent of the marking fluid. In other words, it is avoided by the above described crystalline boundary layer, which has been formed due to the admixture of the solid as used according to the present invention, that the marking fluid and in particular the solvent which is located under said crystalline boundary layer, evaporates through said boundary layer. In addition only a thin and soft boundary layer is formed so that no difficulties are involved if the process of writing again is started. Said boundary layer is torn open or torn apart, respectively, upon contacting the recording support so that the capillary outlet opening is freed again and the marking fluid can flow out and emerge again. Consequently a reduction of the quality of the stroke or line is not observed. The boundary layer regenerates itself autonomously due to the admixture of the solid as used according to the present invention, which act together with the other components of the marking fluid, within a couple of seconds or a couple of minutes dependent on the volatility of the solvent or solvent mixture employed.

In this context it has to be emphasized that the behaviour described can be observed if the evaporation of the solvent of the marking fluid takes place out of capillaries through which the marking fluid is guided to a nib or to an outlet opening. The forming of the crystalline bounding layer, which is liquid crystalline to solid crystalline dependent on the kind and/or amount of the solid as used according to the present invention, can be explained as follows, whereby said explanation is not obligatory but rather an attempt to explain the observations made.

The solid as used according to the present invention which is also called antiblocking additive possesses in the solvent employed the above described crystallizing properties. In other words, the anti-blocking additive employed possesses good crystallizing properties and forms upon evaporation of the volatile components of the marking fluid numerous and well growing crystals. This observation can be made if—as already pointed out above—the solvent or solvent mixture is free of a common dye or pigment as well as free of components having a high boiling point, resins and other common additives.

Said dye or said pigment has, upon evaporation of the volatile component of the marking fluid at the capillary outlet openings, normally properties which are almost diametrally contradictory to the properties of the anti-blocking additive. The dye or the pigment as well as the resins, if present, and in particular polymer resins, do not form growing crystallites but join together at the capillary outlet opening to form a sticky, amorphous mass which closes the outlet opening.

In case the antiblocking additive as used according to the present invention is employed together with such a dye or pigment and eventually together with a resin, then the crystallizing properties which are almost opposite to each other are balanced and the liquid crystalline to solid crystalline boundary layer is formed which can, however, be removed without difficulties when the process of writing again is started. The capacity to be stored in an open manner of the marking fluids, which have been admixed with the antiblocking additive as used according to the present invention, is improved by at least the factor 2 by the formation of the crystalline boundary layer. The above mentioned capacity to be openly stored is defined as the interval during which a marking fluid in a standard writing instrument having a capillary outlet opening remains ready to writing and therefore usable. Such a standard writing instrument possesses a housing with an air inlet and with a capillary ink storage tank arranged within the housing. The nib of said standard writing instrument is a plastic nib with extruded and sheathed channels (capillaries) which are connected with the ink storage tank. Such standard writing instruments are known and available on the market.

The details given within the present documents with respect to the capacity to be openly stored refer to a fine writing instrument having a typical nib 15 and a typical storage tank, i.e.

nib: plastic nib PN—0.8×30 mm available from the company Teibow, Tokyo storage tank: polyester fiber sheathed with polyester 6.5×90 mm, type FF 11495, available from the company Filtrona, Reinbeck via Hamburg, Federal Republic of Germany.

The antiblocking additive is preferably used in an amount of 1 to 50 weight %, more preferably in an amount of 1 to 20% by weight and in particular preferred in an amount of 5 to 10% by weight, based on the final composition of the marking fluid.

The antiblocking additive as used according to the present invention possesses preferably a melting point $\geq 50°$ C. Its molecular weight is preferably $\leq 500$ Dalton.

The antiblocking additive or solid, respectively, as used according to the present invention is preferably an inorganic salt, an organic acid or a derivative thereof, an amino acid (in particular an $\alpha$- or $\beta$-amino acid) or a derivative thereof, an isocyclic, polycyclic or heterocyclic compound or a derivative thereof, a sugar or a sugar alcohol or a derivative thereof, urea or a derivative thereof or a sulfur compound. The derivatives mentioned are common derivatives.

Examples of antiblocking additives which can be used are given below:

1. organic acids and derivatives thereof, such as citric acid, salicylic acid, benzoic acid, acetylsalicylic acid, carbamic acid methyl ester, salicylamide, DL-malic acid, gallic acid, ethyl gallate, citrazinic acid, cholic acid, glutaric anhydride, malonic acid, 1-hydroxy-2-naphthoic acid, 6-amino caproic acid, azelaic acid, benzilic acid, 2-benzoyl benzoic acid, betainemonohydrate, 4-tert. butyl benzoic acid, diethylen triaminepentaacetic acid, diethyl malonic acid, dodecanedioic acid, glycolic acid, iminodiacetic acid, succinic acid, itaconic acid, suberic acid, o-cresotic acid, DL-mandelic acid, 2-methoxy benzoic acid, trisodium nitrilotriacetat; sorbic acid, o-toluic acid, trimesic acid, 3,4,5-trimethoxy benzoic acid, veratric acid, ascorbic acid, L(+)-tartaric acid and L(+)-dimethyl tartrate.

2. amino acids and derivatives thereof, such as glycine, histidine, L-tyrosine, glycyl-glycine, phenylglycine, β-alanine, DL-lysine, DL-pyroglutamic acid, sarcosine, L-serine, DL-alanine, L-arginine.

3. isocyclic compounds and derivatives thereof, such as 3,5-dihydroxy benzoic acid, phenylacetic acid, diphenyl carbonate, diphenylcarbinol, benzoin, azoxyanisole, resorcine, α-naphthol, acetoacetic acid anilide, 3-aminoacetophenone, 4-aminodiphenyl ether, sodium 4-amino salicylate, p-anisic acid, anthranilic acid, benzamide, phenyl benzoate, benzene sulfonamide, 1H-benzotriazole, biphenyl, cyclododecanol, cyclododecanone, 4,4'-diamino dicyclohexyl methane, 4,4'-diamino diphenyl ether, 4,4'-diamino diphenyl methane, N,N'-dibenzyl ethylendiamine diacetate, 2,5-di-tert.butyl hydroquinone, 2,4-dihydorxybenzophenone, 2,2'-dihydroxy biphenyl, 2,5-dimethoxy aniline, 3,5-dinitro benzoic acid, dural, tannic acid, 4-hydroxy biphenyl, N-hydroxy phthalimide, 4-hydroxy propiophenone, dimethyl isophthalate, isovanilline, musk keton, 3-nitro acetophenone, 4-nitro anisole, 4-nitro benzoic acid methyl ester, 3-nitro benzenesulfonic acid, 5-nitro isophthalic acid, phenacetin, ±1-phenyl-1,2-ethanediol, 1-phenyl-semicarbazide, phenyl trimethylammonium chloride, phloroglucine, phthalic acid, pyrogallol, pyromellitic acid, salicylamide, N,N,N',N'-tetramethyl-4,4'diamino diphenyl methane, sodium 4-toluenesulfonate, 2,4,6-trimethyl phenol, vanilline and acetanilide.

4. polycyclic compounds and derivatives thereof, such as dihydroanthracene, fluorene, phenanthrene, cholesteryl acetate, methyl 2-naphthyl ether, fluorenone, β-sitosterine, cholesterine, abietic acid, alizarin (1,2-dihydroxy-anthraquinone), 1-amino anthraquinone, 6-amino-4-hydroxy-2-naphthalenesulfonic acid, quinoxaline, dehydrocholic acid, deoxy cholic acid, 1,4-diamino anthraquinone, 1,4-dihydroxy anthraquinone, 1,5-dihydroxy naphthalene, 3-hydroxy-2-naphthol acid, disodium naphthalene-1,5-disulfonate, 2-naphthoxy acetic acid, 1-naphthyl acetamide, 1-amino naphthalene-5-sulfonic acid.

5. heterocyclic compounds and derivatives thereof, such as 2-phenyl-2-imidazoline, imidazole, hexamethylene tetraamine, carbazole, acetaldehyde ammonia, allantoin, 2-amino pyrimidine, antipyrine, nicotinamine, 5-nitro-2-furfuroldiacetate, 2-phenylindole, 1-phenyl-3-pyrazolidone, phthalazon, phthalide, phthalimide, 2-picolinic acid, 7-(2,3-dihydroxypropyl)-theophylline, diphenylene oxide, fluorescein, 8-hydroxy quinoline, iminodibenzyl, isatin, 4,4'-methylene-diantipyrin, 2-methyl imidazole, 3-methyl-1-phenyl-2-pyrazoline-5-on, 2-methyl piperazine, 4(6)-methyl-2-thiouracil, 4-methyl umbelliferone, succinimide, cis-1,2,3,6-tetrahydrophthalic anhydride, 2,3,5,6-tetramethyl pyrazine, 1,2,4-triazole, benzimidazole.

6. Sugar and sugar alcohols and derivatives thereof, such as glucose, saccharose, xylitol and sorbitol.

7. Urea and derivatives thereof, such as urea, N-phenylurea, N-ethylurea, N-acetyl glycine, semicarbazide hydrochloride, N,N'-dimethylurea, N,N'-diphenylurea, N-methylurea.

8. Acyclic compounds and sulfur compounds, such as dimethylsulfone, pentaerythritol, 2,5-dimethyl-2,5-hexanediol, 2,2-dimethyl-1,3-propanediol, N,N'-diphenylguanidine, N,N'-diphenylthiourea, sodium cyclamate, acetamide, acetoacetamid, ammonium sulfamate, hexadecylamine, sodium isethionate, taurine, tetraethylammoniumbromide, tetramethylammonium bromide, thiophen-2-carboxylic acid, tris-(hydroxymethyl)-amino methane.

9. Inorganic salts, in particular ammonium salts, such as diammonium hydrogen phosphate.

The following antiblocking additives are particularly suited: Phenanthren, Diphenylcarbinol, 3,5-dihydroxybenzoic acid, N-phenyl urea, urea, dimethylsulfone, cholic acid, salicylic acid, carbamic acid methyl ester and N-ethyl urea.

Common solvents for marking fluids are for instance the following: water, aliphatic alcohols with 1 to 4 carbon atoms, such as methyl alcohol, ethyl alcohol, n-propyl alcohol, n-butyl alcohol, sec.-butyl alcohol, tert.-butyl alcohol and isobutyl alcohol; amides, such as dimethylformamide and dimethylacetamide; ketones and keto-alcohols, such as ethyl methyl ketone and diacetone alcohol, ether, such as tetrahydrofurane and dioxane; polyalkylenglycols and polypropylenglycols; alkylenglycols with 2 to 6 carbon atoms within the alkyl radical, such ethylen glycol, propylen glycol, diethylen glycol, 1,2,6-hexane triol, glycerine, ethers from ethylen glycol and propylen glycol, N-methyl-2-pyrrolidone, 1,3-dimethyl-2-imidazolidinone, propylen carbonate, carbonic esters, acetic acid, lactic acid, citric acid and propionic acid, dimethyl sulfoxide, toluene, xylene, trichloro ethane, tetra chloro ethylene, ethylene carbonate.

In order to be employed as antiblocking additive the solid as used according to the present invention has to be soluble in the particular solvent used in the particular marking fluid and has to crystallize in the capillary outlet opening in the manner described above.

The marking fluid can contain besides the above-described solvents also further common additives, such as wetting agents, corrosion inhibitors, thickening agents, preserving agents and dispersing agents and in particular polymeric dispersing agents.

The antiblocking additives as used according to the present invention are particularly employed in aqueous inks on the basis of water whereby the solvent water is admixed, if desired, with a common alcohol, glycol, a glycol ether or ester and/or with a common solvent which has a high boiling point and which is mixable with water.

As colouring agent or dye, respectively, are used for instance: pigments, azo dyes, metal complex dyes, triarylmethane and related dyes, phthalocyanine dyes, acid dyes, antrachinone and related dyes and/or fluorescing dyes.

For such aqueous inks the following antiblocking additives are particularly suited: derivatives of carbamic acid, sugar alcohols, dimethyl sulfone as well as benzoic acid and the derivatives thereof.

Such an aqueous ink can also contain the other common additives mentioned above.

In particular the following compounds can be used as antiblocking additives:
methyl carbamate $H_2NCOOCH_3$
urea $H_2NCONH_2$
N,N' dimethyl urea $CH_3N(H)CON(H)CH_3$
N-ethyl urea $C_2H_5N(H)CONH_2$
N-phenyl urea $C_6H_5N(H)CONH_2$
Glycin $H_2NCH_2COOH$
Diglycin $H_2NCH_2CONHCH_2$
phenyl glycin $C_6H_5CH(NH_2)CH_2COOH$
DL-alanin $CH_3CH(NH_2)COOH$
DL-histidin $NHCH:NCH:C\ CH_2CH(NH_2)COOH$ DL-tyrosin HOC$_6$H$_4$CH$_2$CH(NH$_2$)COOH
Imidazol The antiblocking additives as used according to the present invention can be also employed in non-aqueous inks and China inks which contain alcohols, ethers and/or esters as solvents which are, if desired, admixed with water or a component having a higher boiling point. In addition resins may also be present.

The colouring component or dye, respectively, of said non-aqueous inks and China inks may be selected from the same groups of compounds as described with respect to the above-mentioned aqueous ink. The same holds true for the further common additives.

The antiblocking additives for said non-aqueous inks and China inks are in particular the following compounds: phenanthren and the derivatives thereof, benzoic acid and the derivatives thereof as well isocyclic, polycyclic and heterocyclic organic compounds.

With reference to the drawings the capillaries 10 are partially responsible for the formation of the boundary layer and the protecting effect of said boundary layer avoiding the evaporation of the solvent. The marking fluid flows through said capillary 10 to the nib 15 and the outlet opening 16 of an ink printer. It should be noted that such a boundary layer or skin, respectively, is not formed at the surface area of the liquid of the marking fluid if said marking fluid is contained in a beaker since the free mobility of the molecules takes care of a uniform concentration of all components of the marking fluid within the complete beaker. However, such an outer balancing of the concentration takes place within the capillaries 10 only at a slow rate so that the liquid crystalline to solid crystalline boundary layer may be formed. The evaporation taking place at the surface of the crystalline boundary layer is reduced to a great extent due to the fact that the molecules of the anti-blocking additive 13 and the other components of the marking fluid, for instance the dye 12, which do not evaporate, make out the greatest part of said surface. This means that the surface for the evaporation process of the volatile parts of the marking fluid becomes very small. Consequently the amount which evaporates becomes also very small. In addition it can be assumed that the mobility of the molecule of the volatile solvent 11 of the marking fluid is slower within the crystalline layer than within the marking fluid itself which reduces once more the volatility, see in this context FIG. 1.

The situation is completely different if the marking fluid is applied to a non absorbing support or pad, for instance to a foil. Under these circumstances, a comparable capillary effect cannot take place. Furthermore, the ratio of the thickness of the applied marking fluid to the breadth of the line is very favourable for the evaporation. Also in this case a liquid-crystalline status can be observed. However, the situation changes so rapidly that the user of a writing instrument will not notice any difference with respect to the drying time on the support between the marking fluid containing an antiblocking additive of the present invention and a marking fluid without such an antiblocking additive. By taking advantage of the above-described physical effects it is possible to provide marking fluids which are wipe-resistant within a couple of seconds when applied on foils but which remain "ready to write" when contained in an openly stored instrument without a cap for the period of a week in such a way that the user will not note any difference between a writing instrument which was not used for a week or longer and an instrument which was not stored for such a period of time.

In case aqueous marking fluids are admixed with a component having a high boiling point, said marking fluid may remain "ready to write" for a couple of weeks. At the beginning of the writing process the user will not notice a change of quality of the marking fluid. In contrast to normal marking fluids, such as aqueous inks containing a component with a high boiling point, the ratio of the component with the high boiling point to water behind the boundary layer within the marking fluid containing an antiblocking additive remains almost constant for a couple of weeks.

By using a marking fluid containing an antiblocking additive of the present invention it is possible to replace the mechanical cup normally required for preventing the drying of the marking fluid in writing instruments by the above-described boundary layer which itself is formed by the marking fluid. This is also valid for those marking fluids which are normally called drawing inks and which contain soot or sootblack particles or other pigments as colouring agent or dye.

Figure 2A:
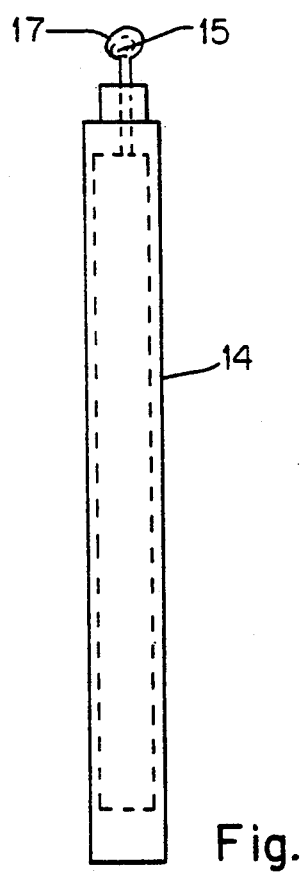
FIG. 2a is a manual tool instrument according to the present invention with growing crystals at the nib.
Figure 2B:
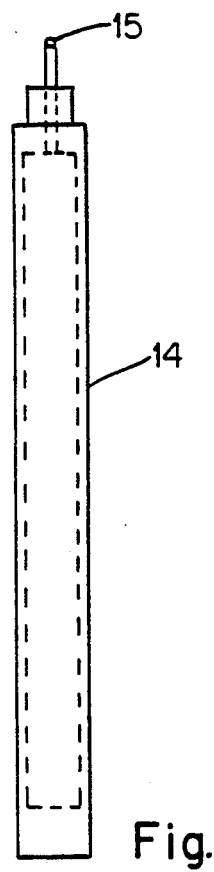
FIG. 2b is a manual tool instrument according to the prior art and is dried out.

The physical effects which take place when the boundary layer of the marking fluids for preventing the evaporation is formed are now described under reference to FIGS. 2a and 2b. Two fibrous writing instruments 14, which each have a nib 15, are both filled with an aqueous solution. The solution contained in the first fibrous writing instrument 14, shown in FIG. 2a, contains 10% urea which is dissolved in water. The second fibrous writing instrument 14, as shown in FIG. 2b, contains water admixed with 2% polyvinyl pyrrolidon K 15 (molecular weight ca. 10.000)

In case said two fibrous writing instruments 14 are not equipped with a mechanical cap and are stored as such the following can be observed:

Crystals 17 grow at the nib 15 (i.e. at the outlet opening 16) of the fibrous writing instrument 14 as shown in FIG. 2a so that layers and cups of crystals are formed. The growing stops only at that moment when the water is completely evaporated from the fibrous writing instrument 14. The nib 15 underneath the pack of crystals 17 is always humid and ready to write after the pack of crystals 17 have been removed.

With respect to the fibrous writing instrument 14 as shown in FIG. 2b, nothing can be seen from the outside. However, the nib 15 is dried out in such a manner as it is observed in the case of already known writing instruments. It is not possible to start writing again with such a marking fluid after the capillary outlet opening 16 has been left open for one hour.

After mixing the fluids of the fibrous writing instruments 14 according to FIGS. 2a and 2b and filling the obtained mixture in a fibrous writing instrument one will observe that nothing can be seen at the nib 15 from the outside. However, it is possible to write with said fibrous instrument 14 still after many days. In this case the boundary layer inhibiting the evaporation has formed. Said boundary layer does not grow or grow out and is teared open by slightly pressing the nib 15 to a support or pad which is not shown. This tearing open of said boundary layer will not be noticed by the writing person and will take care of a continuous flow of the marking fluid.

The above experiments show that two effects, which are normally directed against each other, can be balanced. In the present case this applies to the continuous growing of the urea crystal on the one side and to the backing and bonding of the polyvinyl pyrrolidone molecules on the other side. The latter molecules are normally responsible for the fact that it is impossible to start writing again.

In other words, the molecules which crystallize out, are placed between the other greater molecules (compare FIG. 1) and inhibit there the bonding and backing. In addition also a part of the solvent (in the present case: water) is responsible for the fact that the layer avoiding the evaporation becomes its liquid crystalline structure.

In the above-described example the polyvinyl pyrrolidone is representing a dye and/or a polymeric additive which may also be responsible for the drying out described above. It can be neglected for the example given that the molecules of the dyes commonly used in marking fluids are smaller than the polymer used in the above-described example. It should be noted, however, that in particular China inks contain resins and other polymeric components the behaviour of which is rather similar to that of the polyvinyl pyrrolidone.

In case a marking fluid shall remain "ready to write" for a long period of time and in case such a marking fluid contains a dye which normally bonds and backs together, one has to add the crystallizing antiblocking additive in a sufficient amount to prevent the bonding and backing between the dye molecules. The ratio between the dye and the antiblocking additive should be determined as exactly as possible so that on the one hand a growing crystal formation does not take place and so that on the other side the capacity to be openly stored is as good as possible. In addition the dye and the antiblocking additive should immobilize as many as possible molecules of the liquid within the agglomeration of crystals so that the boundary layer has a soft structure. It should be noticed in this context that the advantages as achieved by the present invention shall also be noticeable even if the amount ratio of dye and resin, if present, on the one hand, to the solid as used according to the present invention, is not determined in an optimal manner.

The solids as used according to the present invention are in particular employed in China inks having the following principal composition (without the antiblocking additive as used according to the present invention):
5-20 percent by weight pigments
5-30 percent by weight resin
0-50 percent by weight alcohol
balance—water, common additives and additional dyes, if desired.

Advantageous marking fluids are for instance as follows:
a China ink as described above plus 5 to 20 percent by weight glycin or urea/urea derivative,
an ink on the basis of spirit/ethyl methyl ketone having dissolved therein a dye plus phenanthren
pigmented ink plus urea/urea derivative.

The ability to remain "ready to write" of marking fluids containing the antiblocking additive of the invention and without said antiblocking additive is demonstrated on the basis of the following examples, whereby the time interval is given during which said marking fluids remained "ready to write". All marking fluids were filled in writing instruments having a filter storage tank and a fibrous nip.

EXAMPLE 1

Solvent: water
dye: Duasyn-direct blue FBL01 (Direct Blue 199)
additive: diammonium hydrogen phosphate $(NH_4)_2HPO_4$
compositions:
  5% Duasyn-direct blue, 95% water,
    open storage capacity: *) ca. ½ h
  5% Duasyn-direct blue, 7% diammonium hydrogen phosphate, 88% water
    open storage capacity: at least 2 d

*) the term "open storage capacity" refers to the capacity of the marking fluid to be openly stored as explained in the description

EXAMPLE 2

Solvent: water
dye: ink blue BJT (Acid Blue 93, CI 42780)
additive: urea, $NH_2CONH_2$, citric acid $HOC(COOH)(CH_2COOH)_2$ mixtures:
  1% ink blue, 0,2% acetic acid, water
    open storage capacity: ca. 5 h
  1% ink blue, 1% citric acid, 2% urea, 96% water
    open storage capacity: at least 7 d

EXAMPLE 3

Solvent: Ethanol
dye: Neozapon red 335 (Solvent red 122, CI 12716:1)
additive: diphenylcarbinol $(C_6H_5)_2CHOH$
compositions:
  15% Neozapon red 335, 85% ethanol
    open storage capacity: ca. 4 h
  15% Neozapon red 335, 10% diphenylcarbinol, 75% ethanol
    open storage capacity: at least 4 d

EXAMPLE 4

Solvent: Trichloro ethane
dye: Sudan black (Solvent black 3, CI 26150)
additive: diphenylcarbonate $(C_6H_5O)_2CO$
compositions:
  12% Sudan black, 88% 1,1,1-trichloro ethane
    open storage capacity: ca. ½ h
  12% Sudan black, 15% diphenyl carbonate, 73% 1,1,1-trichloroethan
    open storage capacity: at least 2 d

EXAMPLE 5

Solvent: Water/ethanol mixture
dye: Flexonyl red FGR-LA (Pigment red 112, CI 12730)
additive: N-ethyl urea $C_2H_5NHCONH_2$
compositions:
  5% Flexonyl red, 95% water/ethanol 1:1
    open storage capacity: ca. 6 h
  5% Flexonyl red, 10% ethyl urea, 85% water/ethanol 1:1
    open storage capacity: at least 7 d

EXAMPLE 6

Solvent: water/ethylene glykol mixture
dye: Duasyn-direct blue FBL01 (Direct Blue 199)
additive: urea
compositions:
  2% Duasyn-direct blue, 98% water/ethylene glykol 4:1
    open storage capacity: ca. 10 d
  2% Duasyn-direct blue, 5% urea, 93% water/ethylenglykol 4:1
    open storage capacity: at least 60 d.

We claim:

1. A process for preparing an improved marking fluid for writing instruments which have a common capillary outlet opening to increase the open storage capacity of said writing instrument, wherein said marking fluid is dispensed through said capillary opening, said process of preparing said marking fluid comprising:
   preparing a common solvent or solvent mixture;
   dissolving a common dye in said solvent or solvent mixture;
   selecting an antiblocking additive comprising at least one solid wherein said antiblocking additive has a melting point greater than or equal to about 30° C. and a molecular weight equal to or less than about 500 Dalton, said selecting comprising the step of checking the ability of said antiblocking additive to exhibit crystallizing properties at said capillary opening, said crystallizing properties of said antiblocking additive at said capillary opening serving the purpose of defining the antiblocking additive used,
   wherein said crystallizing properties are characterized by the antiblocking additive crystallizing at said capillary outlet under the formation of growing crystals when placed in the solvent or solvent mixture alone, without the presence of said common dye, and
   wherein said antiblocking additive forms a protective and anti-evaporating layer at said capillary outlet opening when said opening is unprotected and not in use; and
   adding said antiblocking additive in an amount of at least 1% by weight based on the final composition of said marking fluid.

2. Process of claim 1, wherein said antiblocking additive is at least one compound selected from the group consisting of an inorganic salt, an organic acid, an amino acid, an isocyclic, polycyclic or heterocyclic organic compound, a sugar or a sugar alcohol, urea or a common derivative thereof and a sulfur compound.

3. Process according to claim 1, wherein said antiblocking additive is dissolved in an ink or china ink including water as the solvent and wherein said antiblocking additive is at least one compound selected from the group consisting of diammonium hydrogen phosphate, citric acid, carbamic acid, a common carbamic acid derivative, a sugar alcohol, dimethylsulfon, benzoic acid or a common derivative thereof, urea or urea derivative of the general formula R—NHCO—H-N—R, wherein one of the radicals R or both radicals R represent a hydrogen atom, a linear or branched alkyl radical with 1 to 8 C—atoms or an aromatic radical with 1 to 20 C—atoms, glycine, diglycine, phenylglycine, alanine, histidine, tyrosine, imidazole and an oligo peptide having up to 12 amino acids.

4. Process according to claim 1, wherein said antiblocking additive is dissolved in an ink or China ink including an alcohol, ether, ketone, or mixtures thereof in the solvent and wherein said antiblocking additive is at least one compound selected from the group consisting of phenanthrene or a common derivative thereof, benzoic acid or a common derivative thereof and an isocyclic, polycyclic or heterocyclic organic compound.

5. Process according to claim 1, wherein said antiblocking additive has the characteristic of increasing the open storage capacity of said marking fluid contained in the writing instrument having said capillary outlet opening by at least a factor of 2-4.

6. Process according to claim 1, wherein said antiblocking additive has a melting point of $\geq$ about 50° C.

7. Process of claim 1, wherein said antiblocking additive is used at 1 to 50% by weight of the final composition of the marking fluid.

8. The improved marking fluid prepared according to claim 1.

9. A writing instrument comprising marking fluid, a common capillary outlet opening for dispensing said marking fluid from said capillary opening and means for containing said marking fluid, wherein said marking fluid is prepared according to the process of claim 1.

10. A process for preparing an improved marking fluid for writing instruments which have a common capillary outlet opening to increase the open storage capacity of said writing instrument, wherein said marking fluid is dispensed through said capillary opening, said process of preparing said marking fluid comprising:
    preparing a common solvent or solvent mixture;
    adding a common pigment to said solvent or solvent mixture;
    selecting an antiblocking additive comprising at least one solid wherein said antiblocking additive has a melting point greater than or equal to about 30° C. and a molecular weight equal to or less than about 500 Dalton, said selecting comprising the step of checking the ability of said antiblocking additive to exhibit crystallizing properties at said capillary opening, said crystallizing properties of said antiblocking additive at said capillary opening serving the purpose of defining the antiblocking additive used,
    wherein said crystallizing properties are characterized by the antiblocking additive crystallizing at said capillary outlet under the formation of growing crystals when placed in the solvent or solvent mixture alone, without the presence of said common pigment and
    wherein said antiblocking agent forms a protective and anti-evaporating layer at said capillary outlet opening when said opening is unprotected and not in use; and
    dissolving said antiblocking agent additive in said common solvent or solvent mixture in an amount of at least 1% by weight based on the final composition of said marking fluid, in said marking fluid;
    wherein said antiblocking additive is at least one selected from the group consisting of an inorganic salt, an organic acid, an amino acid, an isocyclic, polycyclic or heterocyclic organic compound, a sugar or a sugar alcohol and a sulfur compound.

11. Process according to claim 10, wherein said antiblocking additive has a melting point of $\geq$ about 50° C.

12. Process of claim 10, wherein said antiblocking additive is used at 1 to 50% by weight of the final composition of the marking fluid.

13. Process according to claim 10, wherein said antiblocking additive is at least one compound selected from the group consisting of phenanthrene or a common derivative thereof, benzoic acid or a common derivative thereof and an isocyclic, polycyclic or heterocyclic organic compound.

14. Process according to 18, wherein said antiblocking additive has the characteristic of increasing the open storage capacity of said marking fluid contained in the writing instrument having said capillary outlet opening by at least a factor of 2-4.

15. The improved marking fluid prepared according to claim 10.

16. A writing instrument comprising marking fluid, a common capillary outlet opening for dispensing said marking fluid from said capillary opening and means for containing said marking fluid, wherein said marking fluid is prepared according to the process of claim 10

17. A process for preparing an improved marking fluid for writing instruments which have a common capillary outlet opening to increase the open storage capacity of said writing instrument, wherein said marking fluid is dispensed through said capillary opening, said process of preparing said marking fluid comprising:
preparing a common solvent or solvent mixture;
dissolving a common dye in said solvent or solvent mixture;
selecting an antiblocking additive comprising at least one solid wherein said antiblocking additive has a melting point greater than or equal to about 30° C. and a molecular weight equal to or less than about 1000 Dalton, said selecting comprising the step of checking the ability of said antiblocking additive to exhibit crystallizing properties at said capillary opening, said crystallizing properties of said antiblocking additive at said capillary opening serving the purpose of defining the antiblocking agent used,
wherein said crystallizing properties are characterized by the antiblocking additive crystallizing at said capillary outlet under the formation of growing crystals when placed in the solvent or solvent mixture alone, without the presence of said common dye, and
wherein said antiblocking additive forms a protective and anti-evaporating layer at said capillary outlet opening when said opening is unprotected and not in use; and
dissolving said antiblocking additive in said common solvent or solvent mixture in an amount of at least 1% by weight based on the final composition of said marking fluid;
wherein said antiblocking additive is at least one selected from the group consisting of a diammonium hydrogen phosphate, citric acid, carbamic acid, or a common derivative thereof, a sugar alcohol, dimethyl sulfone, benzoic acid or a common derivative thereof, glycine, diglycine, phenylglycine, alanine, histidine, tyrosine, imidazole and an oligo peptide having up to 12 amino acids.

18. The improved marking fluid prepared according to claim 17.

19. A writing instrument comprising marking fluid, a common capillary outlet opening for dispensing said marking fluid from said capillary opening and means for containing said marking fluid, wherein said marking fluid is prepared according to the process of claim 17.

20. A process for preparing an improved marking fluid for writing instruments which have a common capillary outlet opening to increase the open storage capacity of said writing instrument, wherein said marking fluid is dispensed through said capillary opening, said process of preparing said marking fluid comprising:
preparing a common solvent or solvent mixture;
dissolving a common dye in said solvent or solvent mixture and adding a common pigment to said solvent or solvent mixture;
selecting an antiblocking additive comprising at least one solid wherein said antiblocking additive has a melting point greater than or equal to about 30° C. and a molecular weight equal to or less than about 500 Dalton, said selecting comprising the step of checking the ability of said antiblocking additive to exhibit crystallizing properties at said capillary opening, said crystallizing properties of said antiblocking additive at said capillary opening serving the purpose of defining the antiblocking agent used,
wherein said crystallizing properties are characterized by the antiblocking additive crystallizing at said capillary outlet under the formation of growing crystals when placed in the solvent or solvent mixture alone, without the presence of said common dye and said common pigment, and
dissolving said antiblocking additive in said common solvent or solvent mixture in an amount of at least 1% by weight based on the final composition of said marking fluid, in said marking fluid.

21. The improved marking fluid prepared according to claim 20.

22. A writing instrument comprising marking fluid, a common capillary outlet opening for dispensing said marking fluid from said capillary opening and means for containing said marking fluid, wherein said marking fluid is prepared according to the process of claim 20.

* * * * *